United States Patent
Hyatt (10) Patent No.: US 7,509,188 B2
(45) Date of Patent: Mar. 24, 2009

(54) METHODS, SYSTEMS, COMPUTER PRODUCTS AND WEBSITE FOR POWER MAINTENANCE AND RESTORATION

(75) Inventor: Kenneth Jake Hyatt, Marion, SC (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 0 days.

(21) Appl. No.: 11/653,576

(22) Filed: Jan. 16, 2007

(65) Prior Publication Data

US 2008/0172242 A1     Jul. 17, 2008

(51) Int. Cl.
*G06F 3/00* (2006.01)

(52) U.S. Cl. ............... 700/286; 700/79; 700/83; 700/292; 702/59; 702/62; 702/188; 715/700; 715/961; 705/28

(58) Field of Classification Search .......... 700/9, 700/15–17, 22, 79, 80, 83, 286, 292–294; 702/57–59, 60–62, 182–185, 188; 715/700, 715/961, 965; 705/26–28

See application file for complete search history.

(56) References Cited

U.S. PATENT DOCUMENTS

| | | | |
|---|---|---|---|
| 6,122,603 A * | 9/2000 | Budike, Jr. | 702/182 |
| 6,259,972 B1 * | 7/2001 | Sumic et al. | 700/286 |
| 2002/0192516 A1 * | 12/2002 | Tajima | 429/22 |
| 2003/0105544 A1 * | 6/2003 | Kauffman et al. | 700/109 |
| 2004/0111325 A1 * | 6/2004 | Near | 705/26 |
| 2005/0143947 A1 * | 6/2005 | James | 702/122 |

\* cited by examiner

*Primary Examiner*—Sean P Schechtman
(74) *Attorney, Agent, or Firm*—Cantor Colburn LLP (57) ABSTRACT

Methods, systems, computer products and a website for electrical power maintenance and restoration. Exemplary embodiments include an electrical power maintenance and restoration system, including a server having an interface for communicating over a computer network, a database having a region of memory having data related to an inventory of electrical power equipment, a website coupled to the database for accessing the inventory of electrical power equipment in response to an event and a webpage for displaying location-specific data of the inventory of electrical power equipment.

18 Claims, 10 Drawing Sheets

Bulk Site Locator

| Battery Inventory | Rectifier Inventory | Controller Inventory |

| Code | Type | Address | Meter # | Utility Company |
|---|---|---|---|---|
| Central Office 11 | | | | Company A |
| Central Office 52 | | | | Company B |
| Central Office 35 | | | | Company A |
| Central Office 84 | | | | Company A |
| Central Office 51 | | | | Company D |
| Central Office 56 | | | | Company A |
| Central Office 07 | | | | Company B |
| Central Office 48 | | | | Company A |
| Central Office 93 | | | | Company A |
| Central Office 70 | | | | Company C |
| Central Office 41 | | | | Company A |
| Central Office 92 | | | | Company B |

Power Vendors By Location    505

| Central Office 1 | Location 1 |
|---|---|
| Central Office 2 | Location 2 |
| Central Office 3 | Location 3 |
| Central Office 4 | Location 4 |
| Central Office 5 | Location 5 |
| Central Office 6 | Location 6 |
| Central Office 7 | Location 7 |
| Central Office 8 | Location 8 |
| Central Office 9 | Location 9 |
| Central Office 10 | Location 10 |
| Central Office 11 | Location 11 |
| Central Office 12 | Location 12 |

Main Contact List For Power Problems

| Manager | John Smith |
|---|---|
| Number | 123-555-1212 |
| Backup Manager | Joan Smith |
| Number | 234-555-1212 |

*FIG. 6*

Power Maintenance Engineer

| Power Contact | Joe Smith |
|---|---|
| Number | 134-555-1212 |
| Power Group | Mary Smith |
| Number | 431-555-1212 |

District Power Team

| Primary Contact | John Jones |
| --- | --- |
| Number | 567-555-1212 |
| Secondary Contact | Mary Jones |
| Number | 789-555-1212 |

Power Vendor List

| Vendor 1 | Fuel |
| --- | --- |
| Vendor 2 | Power |
| Vendor 3 | Power |
| Vendor 4 | Emergency Repair |
| Vendor 5 | HVAC |
| Vendor 6 | Tools |
| Vendor 7 | Battery Testing |
| Vendor 8 | AC Switch Gear Testing |

*FIG. 9*

Engine Home Page Links

| Central Office 1 Engine | Central Office 2 Engine | Central Office 3 Engine | Central Office 4 Engine |
|---|---|---|---|
| Central Office 5 Engine | Central Office 6 Engine | Central Office 7 Engine | Central Office 8 Engine |
| Central Office 9 Engine | Central Office 10 Engine | Central Office 11 Engine | Central Office 12 Engine |

Engine Inventory

| Code | Location | Fuel Type | Tank Size | Fuel Supplier |
|---|---|---|---|---|
| Central Office 1 Engine | Location 1 | Diesel | 500 | Company A |
| Central Office 2 Engine | Location 2 | LP Gas | 500 | Company B |
| Central Office 3 Engine | Location 3 | LP Gas | 1000 | Company A |
| Central Office 4 Engine | Location 4 | Diesel | 650 | Company A |
| Central Office 5 Engine | Location 5 | LP Gas | 500 | Company D |
| Central Office 6 Engine | Location 6 | Diesel | 1000 | Company A |
| Central Office 7 Engine | Location 7 | Diesel | 1000 | Company B |
| Central Office 8 Engine | Location 8 | Diesel | 500 | Company A |
| Central Office 9 Engine | Location 9 | LP Gas | 650 | Company A |
| Central Office 10 Engine | Location 10 | LP Gas | 500 | Company C |
| Central Office 11 Engine | Location 11 | Diesel | 500 | Company A |
| Central Office 12 Engine | Location 12 | Diesel | 500 | Company B |

Printable Power Forms

| Power Vendor Contact Forms | Binder Forms | IN CASE OF FIRE |
|---|---|---|
| Central Office 1 | TAB : C | John Smith |
| Central Office 2 | | Mary Jones |
| Central Office 3 | | |
| Central Office 4 | Building Emergency Organization | CONTACT LIST FOR POWER PROBLEMS |
| Central Office 5 | | |
| Central Office 6 | John Smith | John Smith |
| Central Office 7 | Mary Jones | Mary Jones |
| Central Office 8 | | |
| Central Office 9 | BUILDING EMERGENCY ESCALATION CALL TREE | SPILL RESPONSE |
| Central Office 10 | | |
| Central Office 11 | John Smith | Spill Company |
| Central Office 12 | Mary Jones | |
| | | |
| | EMERGENCY NUMBERS | Power Routines |
| | Mickey Sauls | List of Power Routines |
| | Mike Skipper | Work Type Reference Sheet |
| Blank Power Forms | | Company Practices |
| | | Power Operations & Maintenance Plan |
| Engine Log | | |
| Engine Start Battery | Power Equipment Details | |
| Engine Room Work Activity | | |
| Tank System Activity | Engine Inventory | Bulk Site Locations |
| Tank System Activity II | Portable Engine Connections | Bulk Site Rectifier Inventory |
| Scrap Disposition Record | Central Office Reserve Time | Bulk Site Battery Inventory |
| Hardware Equip. Disposition | Power Troubles | Bulk Site Power Controllers |

*FIG. 11*

METHODS, SYSTEMS, COMPUTER PRODUCTS AND WEBSITE FOR POWER MAINTENANCE AND RESTORATION

BACKGROUND

The present invention relates generally to websites and web pages on the Internet, and more particularly, to methods, systems, computer products and a website for electrical power maintenance and restoration.

Electrical power is a fundamental and essential resource in modern society. Equipment used for electrical power therefore must be maintained in good working order. In addition, during storms and other events, power equipment can become damaged, resulting in power loss for a region serviced by the equipment. Power team technicians must respond by identifying the equipment that has been damaged, assess the damage and identify the solution for repairing the equipment and restoring the power. As of now, there is no application to access equipment details, site locations of the equipment directions, meter or account numbers, vendor relations, including power companies, contact numbers, and other needed information to maintain and restore electrical power.

BRIEF SUMMARY

Exemplary embodiments include an electrical power maintenance and restoration system, including a server having an interface for communicating over a computer network, a database having a region of memory having data related to an inventory of electrical power equipment, a website coupled to the database for accessing the inventory of electrical power equipment in response to an event and a webpage for displaying location-specific data of the inventory of electrical power equipment.

Additional exemplary embodiments include a method of operating a website that is used for electrical power maintenance and restoration, the method including identifying a region having electrical power equipment in need of at least one of electrical power maintenance, and electrical power restoration, accessing a website having a plurality of webpages, a subset of the plurality of webpages corresponding to the region and navigating through the plurality of webpages to retrieve a desired electrical power maintenance and restoration characteristic related to the region.

Further exemplary embodiments include a computer-readable medium having computer-executable instructions for performing a method, including generating a home webpage for a website, generating webpages having a regional hierarchy, generating webpages related to regions having electrical power equipment, generating webpages related to the electrical power equipment and generating webpages related to contact information of persons who can provide services for at least one of maintenance and restoration of the electrical power equipment, wherein the webpages are navigable among each other through linking.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 10A illustrates an exemplary engine homepage and inventory webpage;

The detailed description explains the exemplary embodiments, together with advantages and features, by way of example with reference to the drawings.

DETAILED DESCRIPTION OF EXEMPLARY EMBODIMENTS

Exemplary embodiment include a centralized database having information needed to maintain and ensure proper power maintenance and provide quick restoration if there has been a power outage. Quick access to power-related information results in fewer site failures and less downtime. Many power locations, including regions, states, districts, central offices, power plants, bulk (remote) sites and telephone cabinet locations, can be centralized into a single database accessible from a website having navigable webpages via a user interface. Furthermore, other power related data can be centralized including, but not limited to fuel tank systems (DHEC inspections), commercial power systems, emergency power systems, batteries, telephone service vendors, etc. A single website centralizes all essential information needed to perform any maintenance or restoration of power related issues for a particular location. In exemplary implementation, the webpages include links to central offices, bulk site locations, directions to the locations, engines, all other power equipment, power forms, other essential forms, technician information, vendor information, power team information, website search pages, feedback pages & other links to oft-used company websites, and other applications. Therefore, any user residing in any of the aforementioned locations can access a single website to perform their duties efficiently and quickly. An emergency operations center has access to much needed information such as, but note limited to: 1) detailed site information 2) power company account numbers and contact numbers 3) equipment details and photos. As such proper maintenance, coverage, equipment replacement, updates and repair can be implemented.

Figure 1:
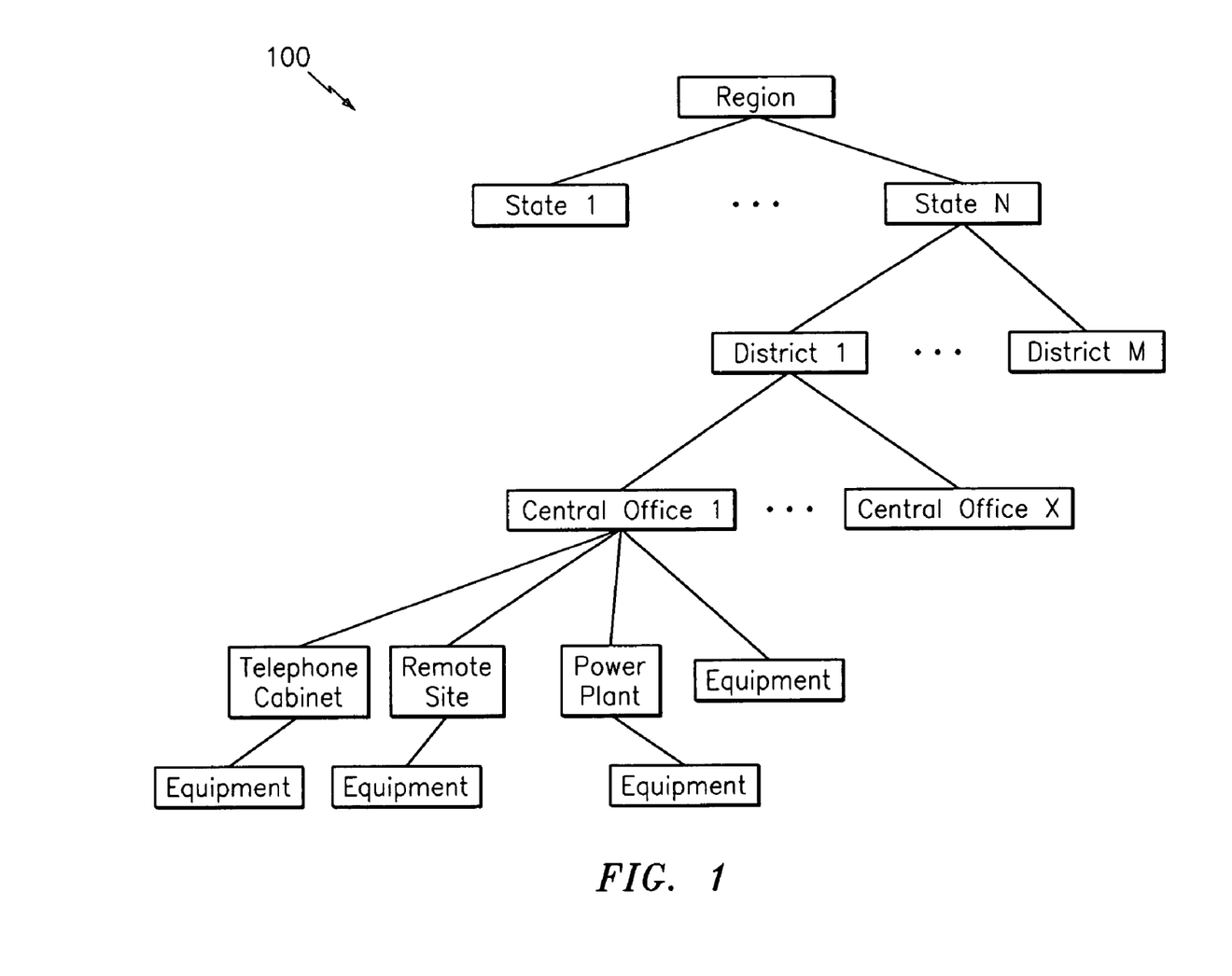
FIG. 1 illustrates an exemplary hierarchy of power equipment locations in which electrical power maintenance and restoration service can be implemented.

FIG. 1 illustrates an exemplary hierarchy 100 of power equipment locations in which electrical power maintenance and restoration service can be implemented. In general, the systems and methods described herein can be implemented in hierarchal electrical power locations. For example, a particular region of the United States may be served by a telephone provider requiring electrical power. As such a particular region can include several states, each state being further broken down into districts. The districts can be further be broken down into central offices, each central office being serviced by its own equipment. In addition to having its own equipment, each district can further include power plants, bulk sites, telephone cabinets, etc., each having its own equipment. It is appreciated that in other embodiments, there can be additional locations in the hierarchy and still further locations having its own equipment, such as cellular tower locations. As discussed above, each of the locations includes its own unique equipment that includes specification details, pictures, images, diagrams, tank monitors, vendor contacts (e.g., equipment suppliers, parts suppliers, fuel providers, fuel contractors, etc.), maintenance and update schedules, repair details, connection charts, etc. By having all of this information for each piece of equipment at each of the locations in a centralized location, any technician, vendor, manager, etc. can access the central location and be able to address the event (e.g., maintenance, power outage, etc.) quickly and accurately because all equipment details as well as instructions on how to address the event is readily available.

Figure 2:
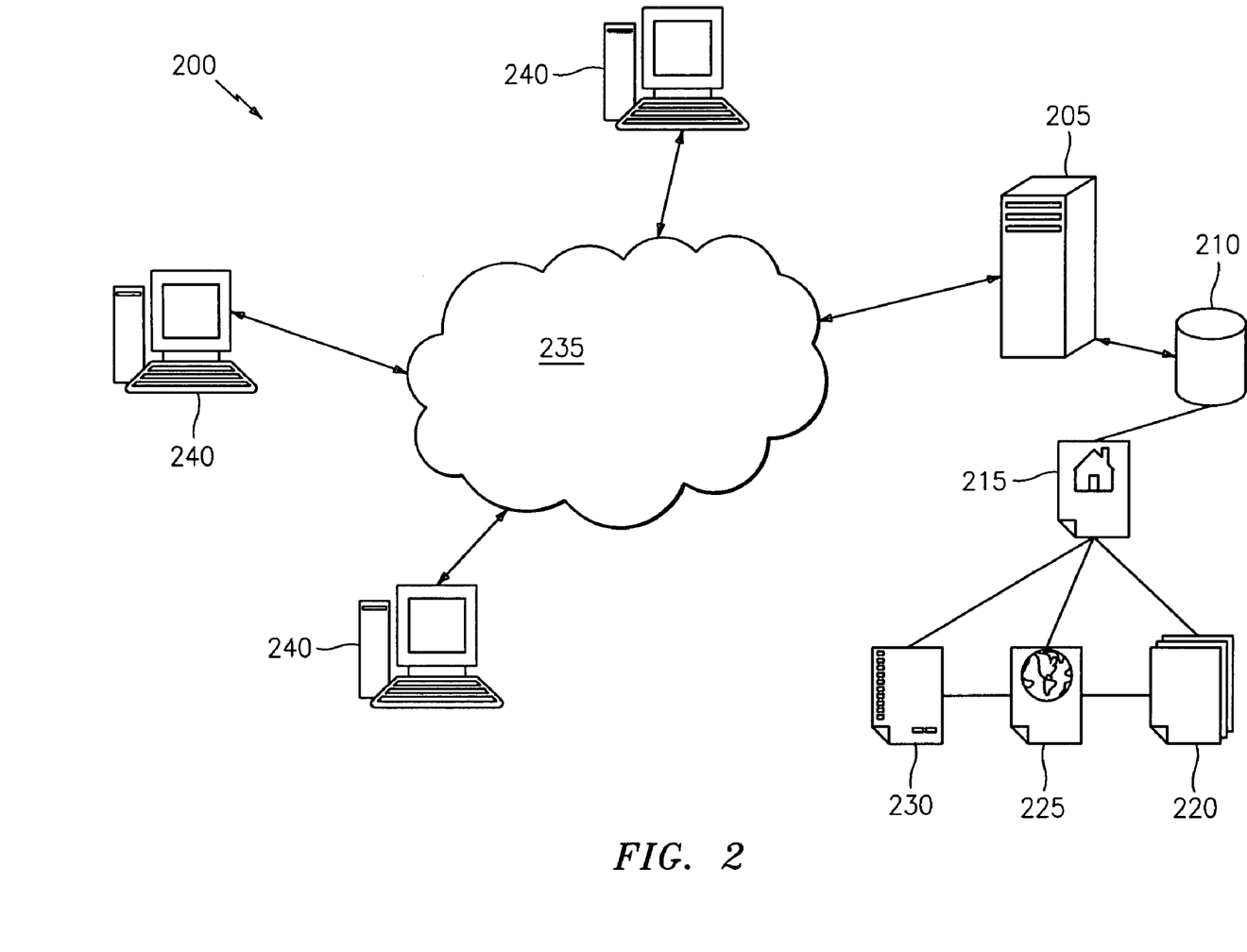
FIG. 2 illustrates an electrical power maintenance and restoration system 200 in accordance with exemplary embodiments.

FIG. 2 illustrates an electrical power maintenance and restoration system 200 in accordance with exemplary embodiments. A central power maintenance and restoration server 205 includes s storage medium 210 that includes all of the equipment data as described above. Storage medium 210 includes data for a website 215 having navigable webpages 225. In general, the website 215 organizes webpages 225, such that webpages 225 are organized as the hierarchy 100 as discussed above. In exemplary implementations, webpages 225 can be linked to one another so that one home page can include links to all states in the region. Each of the state pages can include links to all districts in that state. Each district pages can include links to all of the central offices in the districts. Each of the central office pagers can include links to all power plants, bulk sites, telephone cabinets, etc. in the central office. Furthermore, where there is equipment in the above-described locations, links can be further provided to the pages having information related to the equipment, such as the specifications, images, vendor contacts, etc. as described above. Where appropriate, the webpages 225 can further include links to documents 220 and forms 230. For example, as described above and further below, the documents 220 can include any variety of documents including specification lists, trouble shooting guides, maintenance manuals, etc. Forms can include any necessary form required for power maintenance and restoration including but not limited to: parts order; emergency operating procedures; protocol; log; contact list; spill response; power routines; power equipment details; inventory; tank system activity; scrap disposition; engine start battery, engine log, engine work room, etc.

Server 205 is coupled and in communication with a network 235 such as the Internet. In accordance with exemplary embodiments, network 235 is an IP-based network that transmits data from storage medium 210 to users, such as client devices 240. In exemplary embodiments, network 235 is a managed IP network administered by a service provider, which can control bandwidth and quality of service client needs. Network 235 may be implemented in a wireless fashion, e.g., using wireless protocols and technologies, such as WiFi, WiMax, etc. Client devices 240 can reside at any of the locations as discussed above, particularly those locations have equipment present. It is further understood that client devices 240 can be mobile, such as in the possession of a technician who maintains bulk sites for example. In exemplary embodiments, client device 240 can be a personal computer, a laptop computer, a portable computing device (e.g., personal digital assistant), etc.

As such, a user can access server 205 and the website 215 and navigate webpages 225 to be able to access site and equipment details of a particular location. For example, if a technician is servicing a power generator at a particular bulk site in a particular state, the technician can access server 205 to be able to obtain the exact and current specifications for the power generator, which can further include a troubleshooting guide to determine the type of maintenance or repair that the particular generator may require. If the technician determines that a particular belt, for example, needs replacement, the server further includes data of the type of belt needed and the vendor to contact who can provide the belt. Other information provided by the website can include trouble shooting instructions. For example, if a technician is trying to start a back-up generator that won't start, the technician can access a troubleshooting document that explains the possible causes and solutions of the problem.

Figure 3:
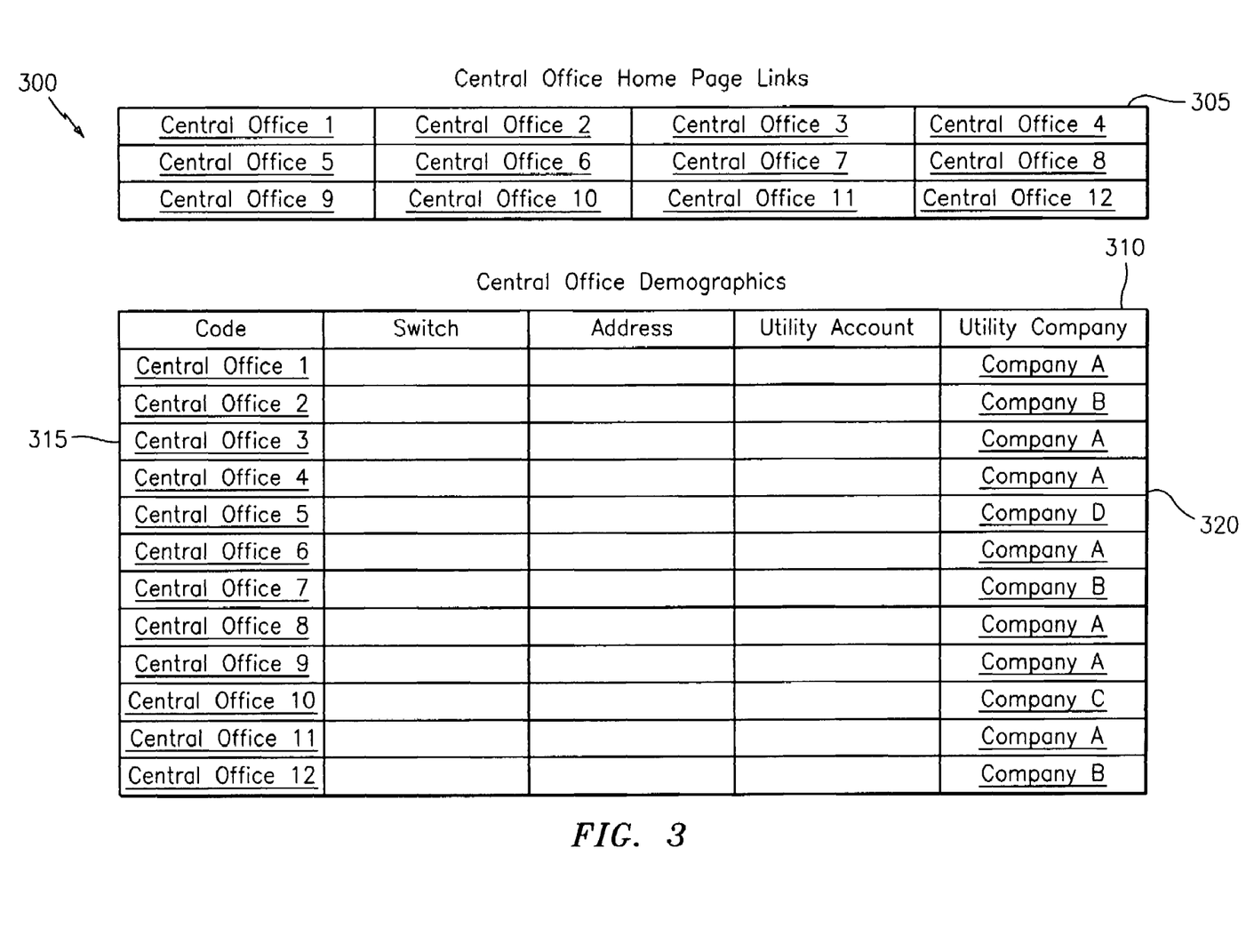
FIG. 3 illustrates an exemplary central office webpage.

FIG. 3 illustrates an exemplary central office webpage 300. As discussed above, a user can access the website 215 and be able to access a number of navigable webpages 225 such as webpage 300, which is representative of a navigation point to a number of central offices, for example Central Office 1-Central Office 12. A group of central office links 305 can allow a user to navigate to other webpages 225 representative of the particular central office, which can include the detailed data of engines, batteries and other electrical power equipment. Such a central office webpage can further indicate the bulk sites, telephone cabinets, cell towers, etc. associated with that particular central office.

Webpage 300 can further include a group of central office demographics links, which can provide pertinent information about each central office, such as the type of switch, address and utility account. Once again, the user can navigate to the particular central office because the column 315 representative of the code of the central office can provide links to the central office. It is appreciated that the central office, and other power locations, can be represented by a code, such as a numeric code, alpha-numeric code, etc. Another column 320 can provide a group of links to particular power companies that are associated with the particular central office. These links can navigate directly to an external website for the power company or to another webpage 225 with additional information related to the power company such as contacts, emergency procedures, etc.

Figure 4:
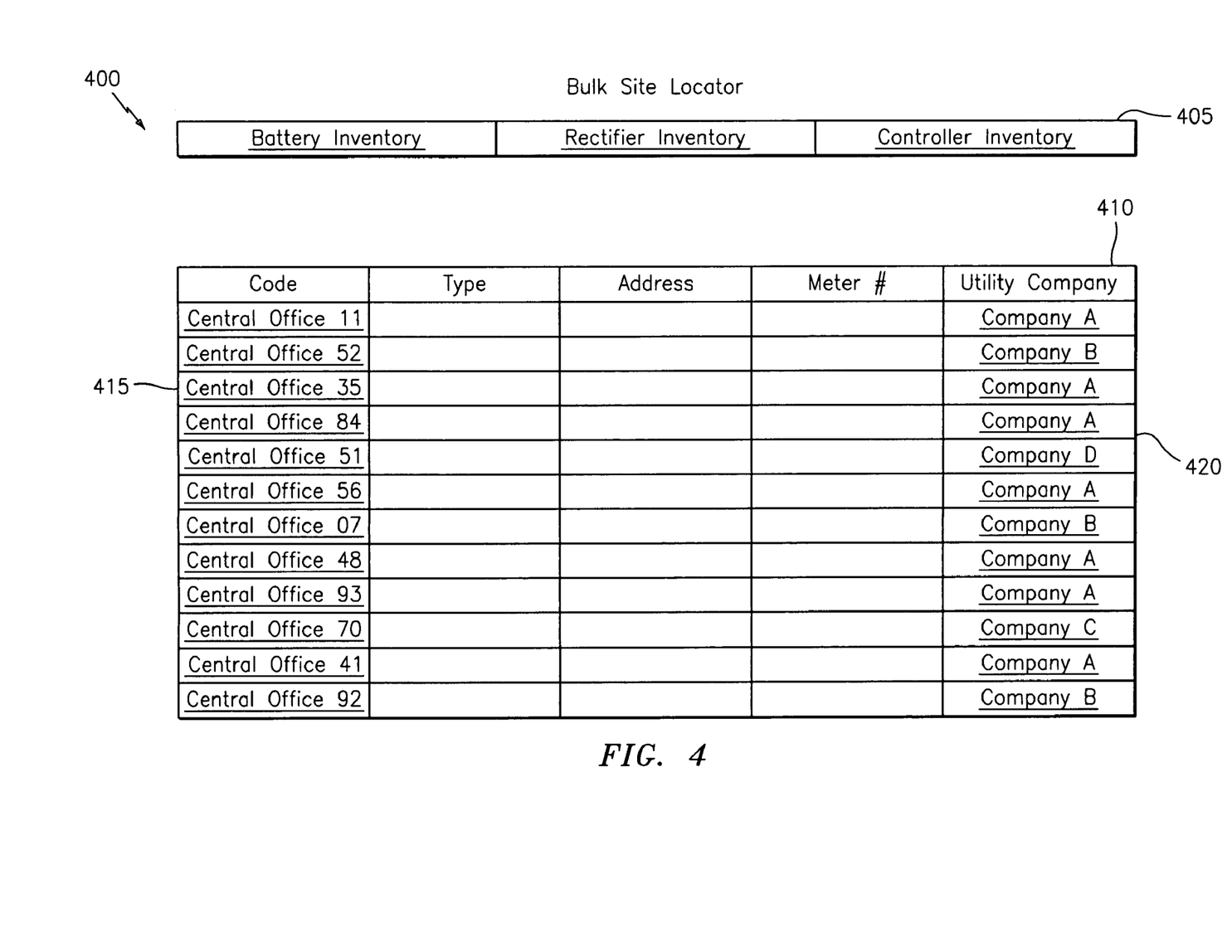
FIG. 4 illustrates an exemplary bulk site locator webpage.

FIG. 4 illustrates an exemplary bulk site locator webpage 400. As discussed above, a user can access the website 215 and be able to access a number of navigable webpages 225 such as webpage 400, which is representative of a navigation point to a number of bulk site locations, which has been reduced for illustrative purposes. In general, it is appreciated that remote bulk sites can be great in number. A first group of links 405 can include specific inventory links to equipment at bulk sites, including, but not limited to: batteries; rectifiers; controllers, etc. By accessing one of the aforementioned links, a user can have direct access to the inventory at the site, the specific data related to the equipment, as well as documentation related to maintenance, restoration, repair, contact, etc. The webpage 400 can further include another group of links 410 that include a column 415 for specific bulk site location links, which can be coded numerically, alpha-numerically etc. The coding provides an indication to the user of the location of the bulk site. For example, the coding can include a name of the central office. Other information can include the type of bulk site, such as a tower, hut, etc., the address of the site and an associated power meter number. Another column 420 can provide a group of links to particular power companies that are associated with the particular central office. These links can navigate directly to an external website for the power company or to another webpage 225 with additional information related to the power company such as contacts, emergency procedures, etc.

Figure 5:
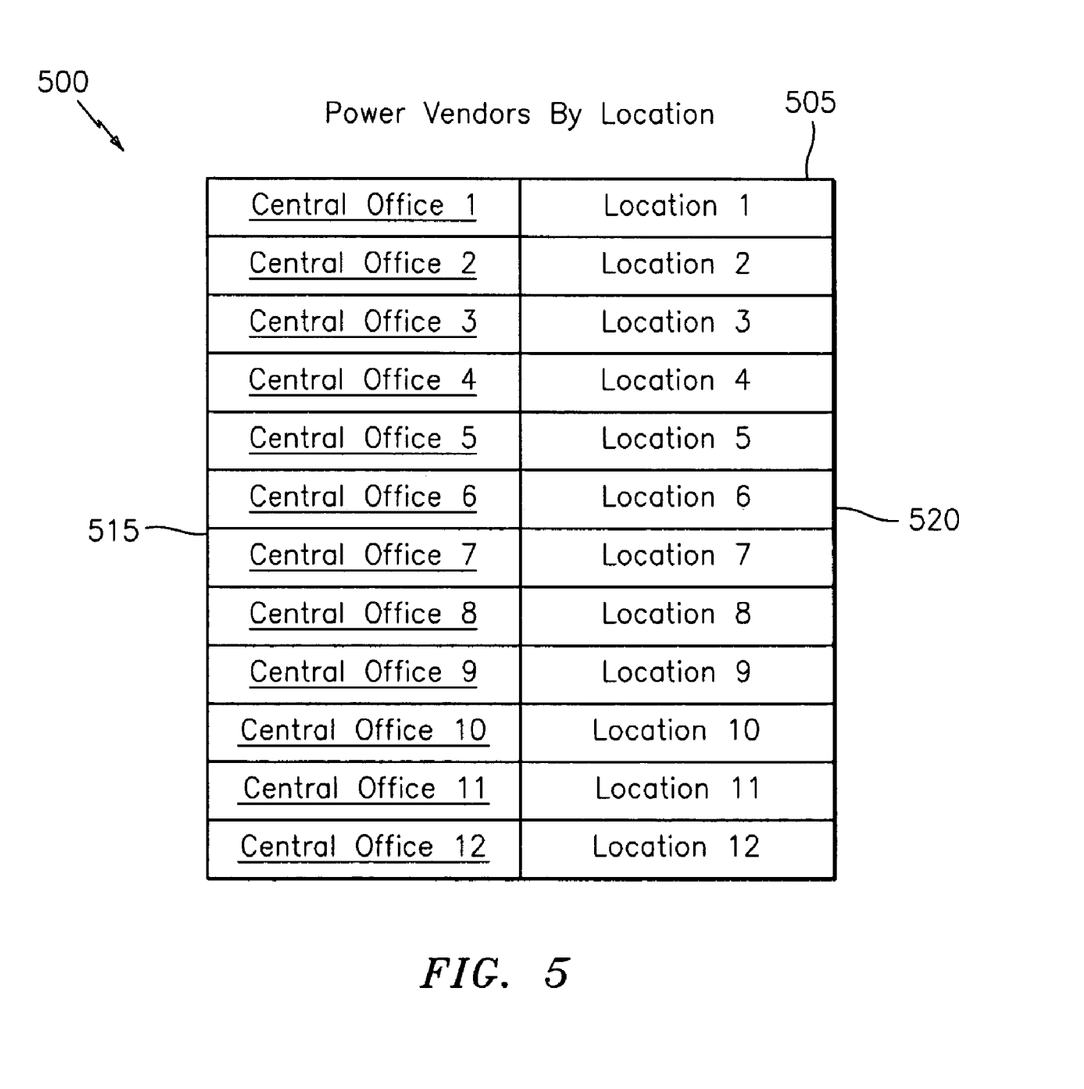
FIG. 5 illustrates an exemplary power vendor locator webpage.

FIG. 5 illustrates an exemplary power vendor locator webpage 500. A user can access the website 215 and be able to access a number of navigable webpages 225 such as webpage 500, providing a group of power vendor links 505, which is representative of a navigation point to a number of the power vendors that service the central offices, for example Central Office 1-Central Office 12, as shown in column 515. The locations of the power vendors are shown in column 520.

Figure 6:
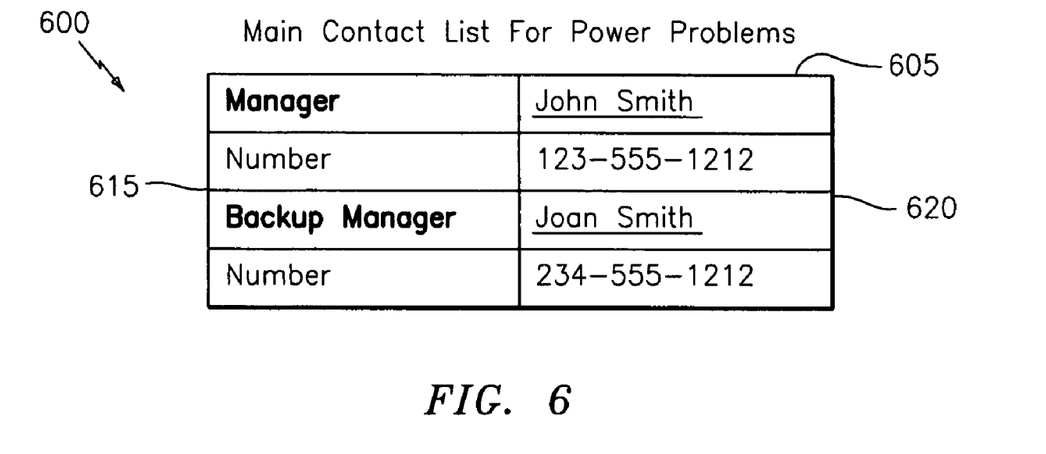
FIG. 6 illustrates an exemplary main contact webpage.

FIG. 6 illustrates an exemplary main contact webpage 600, which can provide the list of contacts, and associated links 605, for power problems, such as location managers. The webpage 600 can include an informational column 615 and associated link column 620 having a link to the contact person(s) and their contact information.

Figure 7:
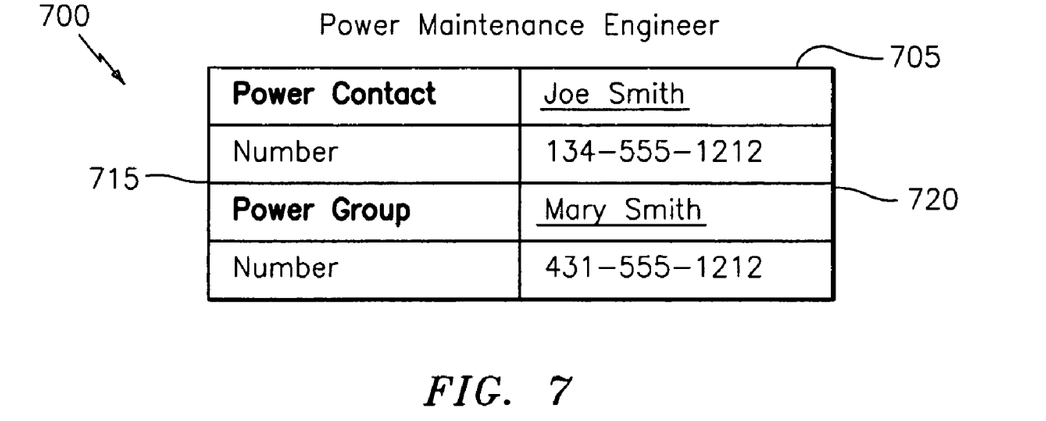
FIG. 7 illustrates an exemplary power maintenance engineer contact webpage.

FIG. 7 illustrates an exemplary power maintenance engineer contact webpage 700, which can provide the list of contacts, and associated links 705, for power maintenance issues, such as location engineers. The webpage 700 can include an informational column 715 and associated link column 720 having a link to the contact person(s) and their contact information.

Figure 8:
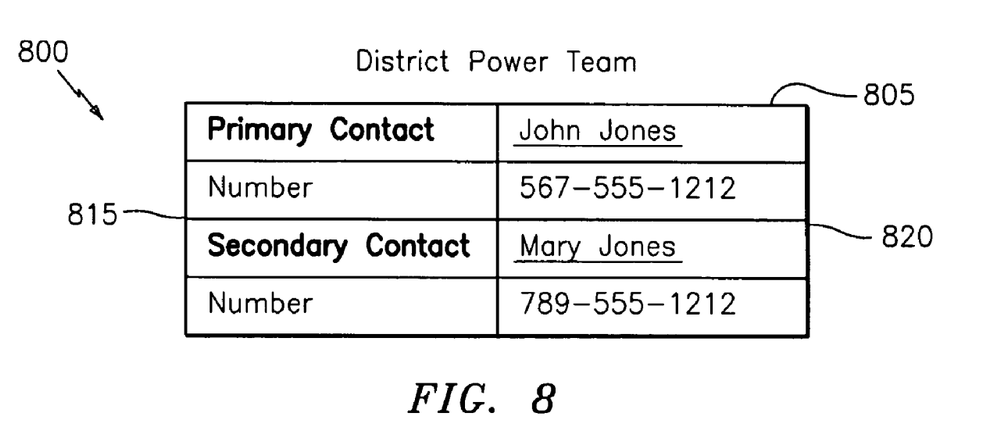
FIG. 8 illustrates an exemplary district power team contact webpage.

FIG. 8 illustrates an exemplary district power team contact webpage 800, which can provide the list of contacts, and associated links 805, for a particular location group, such as a district power team, which can include managers, engineers, technicians, etc. The webpage 800 can include an informational column 815 and associated link column 820 having a link to the contact person(s) and their contact information.

Figure 9:
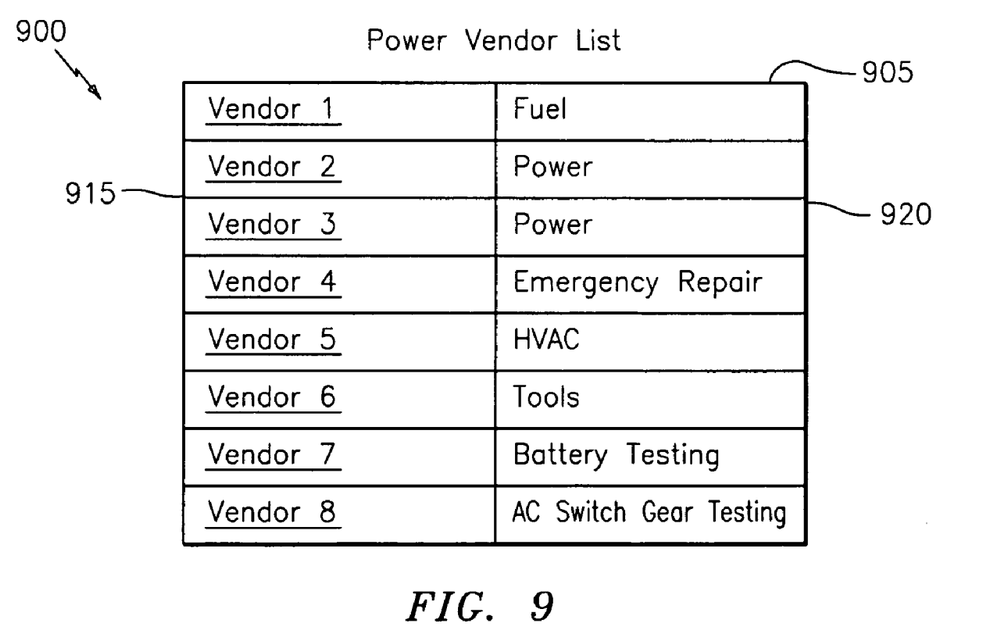
FIG. 9 illustrates an exemplary power vendor contact webpage.

FIG. 9 illustrates an exemplary power vendor contact webpage 900, which can include a group of links 905 related to the vendors and the type of goods/services that the vendor supplies. The webpage 900 can include a column 915 having links directly to an information page on the website 215 for the vendor. In another implementation, the links can lead directly to the vendor's external website. The webpage 900 can further include an information column indicating the good or service that the vendor supplies.

FIG. 10A illustrates an exemplary engine homepage and inventory webpage 1000. As discussed above, a user can access the website 215 and be able to access a number of navigable webpages 225 such as webpage 1000, which is representative of a navigation point to a number of central offices engines, for example Central Office 1 Engine-Central Office 12 Engine. The webpage 1000 can include a group of links 1005, which allow a user to navigate to a webpage 225 having all of the pertinent information and data related to the specific engine. The webpage 1000 can further include a group of links 1010, which provide the specifics about the engines. A column 1015 can provide a group of links, once again, allowing a user to navigate to the engine's webpage. Another column 1035 can provide the location of the engine. Another column 1030 can provide the fuel type used by the engine, such as LP gas, diesel, etc., and another column 1025 including the tank size. The webpage 1000 can further include a column 1020 providing a group of links related to the fuel supplier, which can navigate a user to another webpage 225 with information related to the vendor. In another implementation, the links can lead directly to the vendor's external website.

Figure 10B:
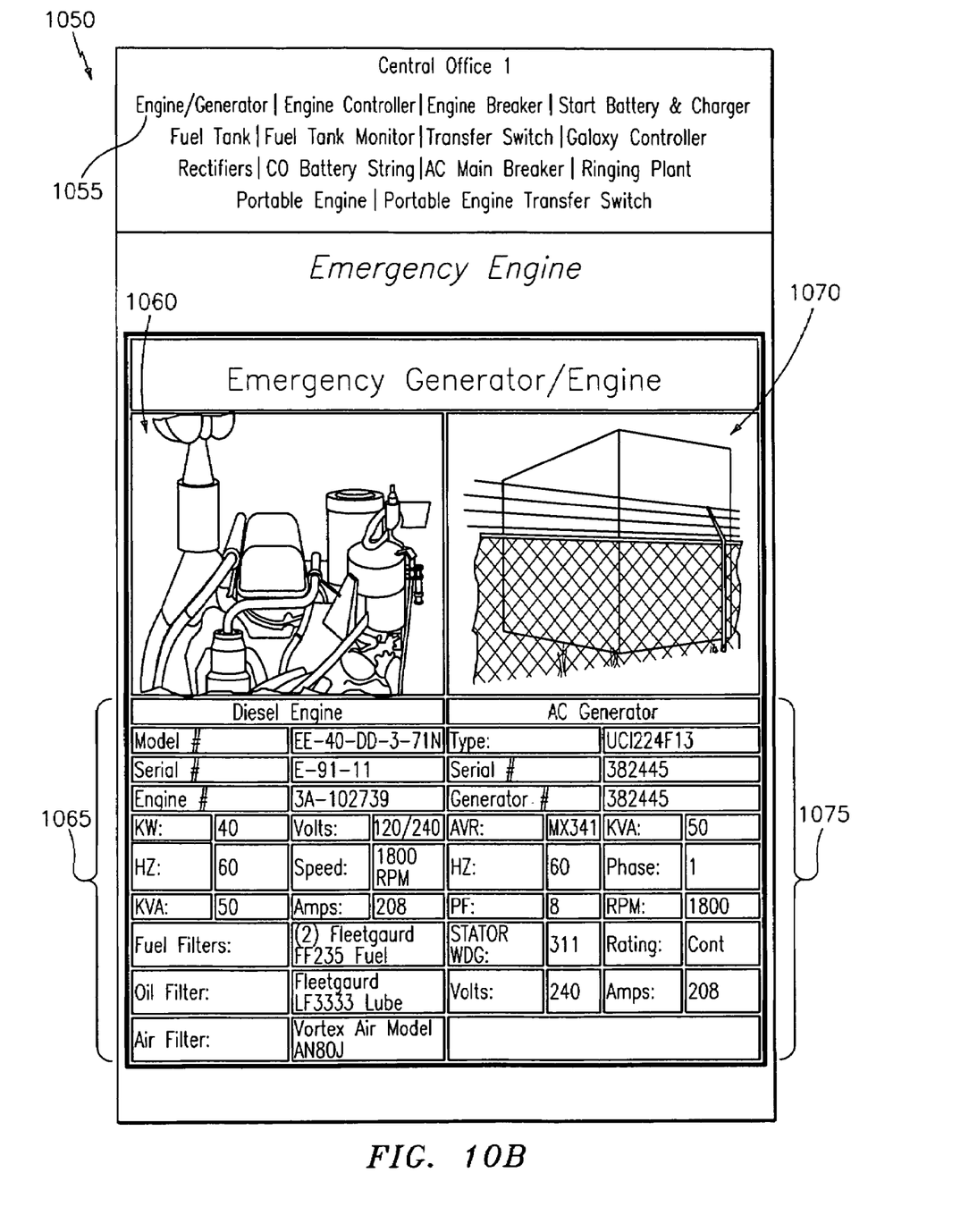
FIG. 10B illustrates an exemplary equipment webpage.

FIG. 10B illustrates an exemplary equipment webpage 1050. As discussed above with respect to FIG. 10A, column 1015 include links that allow a user to navigate to the engine's webpage. Equipment webpage 1050 illustrates an engine webpage for an engine at Central Office 1 (by way of example). It is appreciated that equipment webpage 1050 not only illustrates the engine at Central Office 1, but also all of the equipment at Central Office 1. Therefore equipment webpage 1050 includes a group of links 1055, which allow a user to navigate to all equipment available at Central Office 1. The group of links 1055 can include, but it not limited to: engine/generator; engine controller; engine breaker; start battery and charger; fuel tank; fuel tank monitor; transfer switch; galaxy controller; rectifiers; CO battery string; AC main breaker; ringing plant; portable engine; portable engine transfer switch, etc. Equipment webpage 1050 can also include pictures 1060, 1070 and specifications 1065, 1075 for each piece of equipment at Central Office 1. Pictures 1060, 1070 and specifications 1065, 1075 are available upon a user clicking on one of the links in the group of links 1055. As discussed above, this consolidated listing of equipment and specifications allows a user to have easy access to all pertinent information, contacts, etc. if a power event occurs, thereby eliminating loss of time and inefficiency in managing the event.

Figure 11:
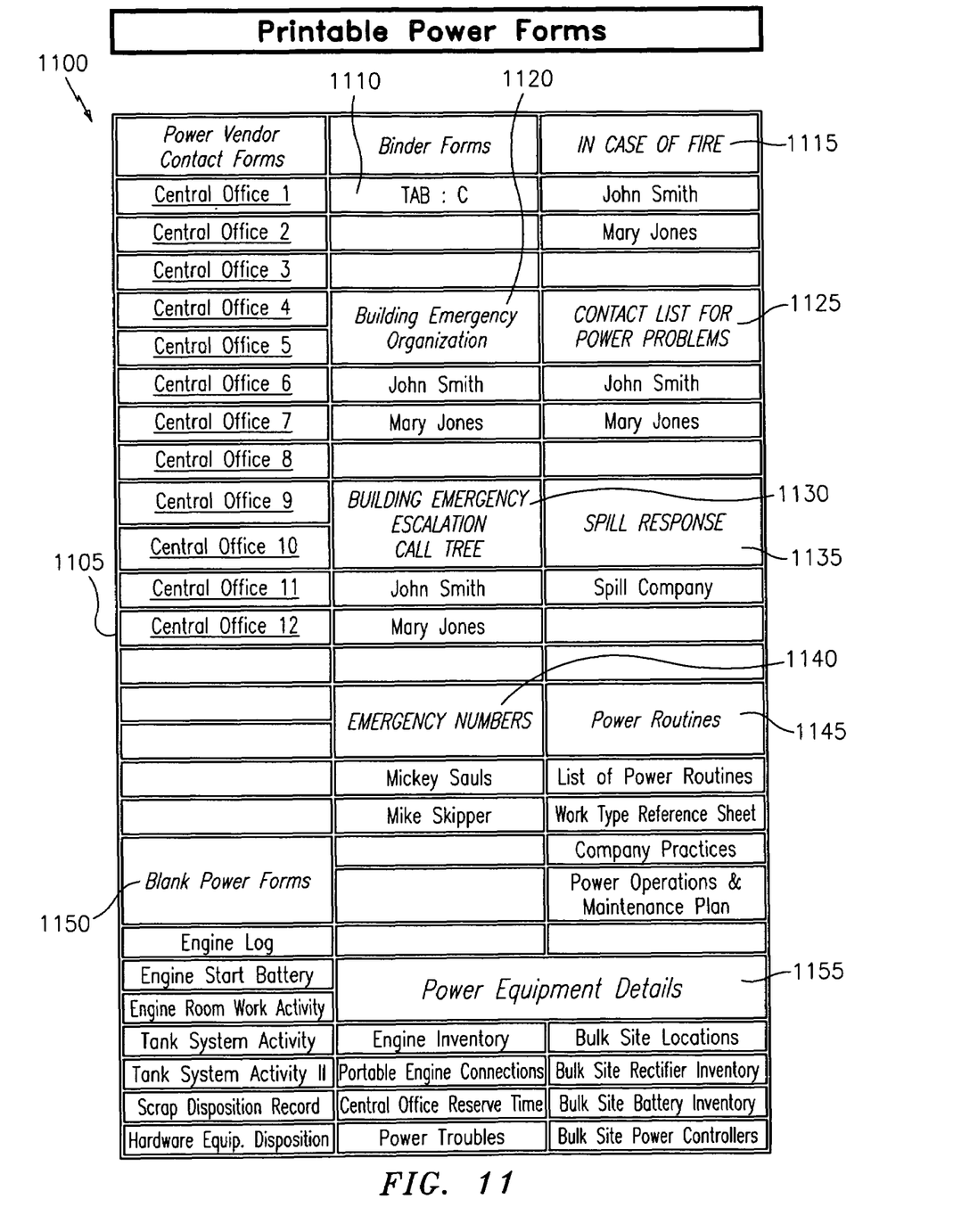
FIG. 11 illustrates an exemplary printable power forms webpage.

FIG. 11 illustrates an exemplary printable power forms webpage 1100. In general, the website 215 provides a webpage 1100 that allows a user to have access to various links that allow a user to retrieve and print electrical power equipment forms. The webpage 100 include links 1105 to forms related to power vendor contacts. Other links include: binder forms links 1110, which provide access to local forms on a local drive such as a C: drive; fire contact form links 1115; building emergency organization form links 1120; contact list for power problems forms links 1125; building emergency escalation call tree form links 1130; spill response form links 1135; emergency number form links 1140, etc. The webpage 1000 can further include power routine form links 1145, which can include forms for: lists of power routines; work type reference sheets; company practices; power operations and maintenance plans, etc. The webpage 1000 can further include blank forms links 1150 including blank forms for: engine logs; engine start battery; engine room activity; tank system activity; scrap disposition record; hardware description disposition, etc. The webpage 1000 can further include power equipment details form links 1155, including: engine inventory; portable engine connections; central office reserve time; power troubles; bulk site locations; bulk site rectifier inventory; bulk site battery inventory; bulk site controllers, etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An electrical power maintenance and restoration system, comprising:
    a server having an interface for communicating over a computer network, wherein the interface comprises a graphical user interface including a display and a selection device;
    a database having a region of memory having data related to an inventory of electrical power equipment;
    a website coupled to the database for accessing the inventory of electrical power equipment in response to an event, wherein the event is a power outage involving the power equipment; and
    a webpage configured to display location-specific data of the inventory of electrical power equipment,
    wherein the webpage includes a first set of links to at least one of documents and forms for power routines, work-type references, company practices, power operations, maintenance plans, engine logs, engine start battery, engine room activity, portable engine connection, central office reserve time, power troubles, bulk site locations, bulk site rectifier inventory and bulk site controllers,
    wherein the webpage further includes a second set of links that hyperlink to at least one of a vendor information webpage and to a vendor's external website, and
    wherein the webpage coordinates navigation between the first set of links and the second sets of links to identify vendors who provide at least one of products and services related to the event.

2. The system as claimed in claim 1 further comprising navigational tools coupled to the graphical user interface for hyperlinking from the location webpage to a webpage of equipment specifications.

3. The system as claimed in claim 2 further comprising navigational tools coupled to the graphical user interface for hyperlinking from the location webpage to a webpage of location layout.

4. The system as claimed in claim 3 further comprising navigational tools coupled to the graphical user interface for hyperlinking from the location webpage to a webpage of contact information.

5. The system as claimed in claim 1 wherein the database further comprises a section of memory having data related to vendors.

6. The system as claimed in claim 5 wherein the database further comprises a region of memory having data related to location specifications.

7. The system as claimed in claim 1 wherein the server includes a process having instructions to:
    retrieve a set of menu entries for a menu on the display, each of the menu entries representing an electrical power characteristic;
    displaying the set of menu entries on the display;
    receiving a menu entry election signal indicative of the selection device pointing at a selected menu entry from the set of menu entries; and
    in response to the signal, performing a search of an electrical power database for data related to the electrical power characteristic.

8. A method of operating a website that is used for electrical power maintenance and restoration, the method comprising:
    identifying a region having electrical power equipment in need of at least one of electrical power maintenance, and electrical power restoration;
    accessing a website having a plurality of webpages, a subset of the plurality of webpages corresponding to the region;
    navigating through the plurality of webpages to retrieve a desired electrical power maintenance and restoration characteristic related to the region,
    wherein the webpage includes a first set of links to at least one of documents and forms for power routines, work-type references, company practices, power operations, maintenance plans, engine logs, engine start battery, engine room activity, portable engine connection, central office reserve time, power troubles, bulk site locations, bulk site rectifier inventory and bulk site controllers,
    wherein the webpage further includes a second set of links that hyperlinik to at least one of a vendor information webpage and to a vendor's external website, and
    wherein the webpage coordinates navigation between the first set of links and the second sets of links to identify vendors who provide at least one of products and services related to the event.

9. The method as claimed in claim 8 further comprising making a determination that the electrical power equipment requires at least one of maintenance and restoration.

10. The method as claimed in claim 9 further comprising accessing a subset of the plurality of webpages related to the electrical power equipment.

11. The method as claimed in claim 9 further comprising accessing a subset of the plurality of webpages for contact information related to the electrical power equipment.

12. The method as claimed in claim 11 wherein the contact information includes at least one of: managers, engineers, technicians and vendors.

13. The method as claimed in claim 9 further comprising accessing a subset of the plurality of webpages for forms related to the electrical power equipment.

14. The method as claimed in claim 9 further comprising accessing a subset of the plurality of webpages for documentation related to the electrical power equipment.

15. A computer-readable medium encoded with a computer program for causing a computer to perform a method for operating a website that is used for electrical power maintenance and restoration, the method comprising:

generating a home webpage for a website;
generating webpages having a regional hierarchy;
generating webpages related to regions having electrical power equipment;
generating webpages related to the electrical power equipment; and
generating webpages related to contact information of persons who can provide services for at least one of maintenance and restoration of the electrical power equipment,
wherein the webpages are navigable among each other through linking
wherein one of the webpages includes a first set of links to at least one of documents and forms for power routines, work-type references, company practices, power operations, maintenance plans, engine logs, engine start battery, engine room activity,
portable engine connection, central office reserve time, power troubles, bulk site locations, bulk site rectifier inventory and bulk site controllers,
wherein the webpage further includes a second set of links that hyperlink to at least one of a vendor information webpage and to a vendor's external website, and
wherein the webpage coordinates navigation between the first set of links and the second sets of links to identify vendors who provide at least one of products and services related to the event.

16. The computer-readable medium as claimed in claim 15 wherein the method further comprises providing access to an electrical power maintenance and restoration database.

17. The computer-readable medium as claimed in claim 16, wherein the method further comprises retrieving data from the electrical power maintenance and restoration database in response to a request for information related to at least one of the regions and the electrical power equipment.

18. The computer-readable medium as claimed in claim 15 wherein the method further comprises providing access to electrical power equipment forms and documents.

* * * * *